(12) United States Patent
Mukaida (10) Patent No.: US 7,877,562 B2
(45) Date of Patent: Jan. 25, 2011

(54) MEMORY CONTROLLER, FLASH MEMORY SYSTEM, AND CONTROL METHOD OF FLASH MEMORY

(75) Inventor: Naoki Mukaida, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/451,902

(22) Filed: Jun. 13, 2006

(65) Prior Publication Data

US 2007/0266202 A1 Nov. 15, 2007

(30) Foreign Application Priority Data

Jun. 13, 2005 (JP) ............... 2005-172240

(51) Int. Cl.
*G06F 12/00* (2006.01)
*G06F 13/00* (2006.01)
*G06F 13/28* (2006.01)

(52) U.S. Cl. .................. 711/162; 711/103; 711/206; 713/2

(58) Field of Classification Search ............. 711/162, 711/206, 103; 713/2
See application file for complete search history.

(56) References Cited

U.S. PATENT DOCUMENTS

| 4,461,001 | A | * | 7/1984 | Bossen et al. | ............... 714/702 |
|---|---|---|---|---|---|
| 4,473,878 | A | * | 9/1984 | Zolnowsky et al. | ......... 711/208 |
| 5,568,641 | A | * | 10/1996 | Nelson et al. | .................. 713/2 |
| 5,960,445 | A | * | 9/1999 | Tamori et al. | ............... 707/203 |
| 2004/0148543 | A1 | * | 7/2004 | Eto et al. | ....................... 714/5 |

FOREIGN PATENT DOCUMENTS

| JP | 11-110141 | 4/1999 |
|---|---|---|
| JP | 2000-163268 | 6/2000 |
| JP | 2002-259152 | 9/2002 |
| JP | 2004-272476 | 9/2004 |

\* cited by examiner

*Primary Examiner*—Stephen C Elmore
*Assistant Examiner*—Mark A Giardino, Jr.
(74) *Attorney, Agent, or Firm*—Howard & Howard Attorneys PLLC (57) ABSTRACT

A flash memory stores a boot program of a host system and its backup program. A memory controller determines whether or not the boot program is stored properly in the flash memory when the host system is to be activated. The memory controller reads out the boot program in a case where the boot program is stored properly, and reads out the backup program in a case where the boot program is not stored properly. Then, the memory controller supplies the read-out boot program or backup program to the host system. This makes it possible to avoid a situation that the host system cannot be activated due to the boot program not being able to be executed.

8 Claims, 10 Drawing Sheets

| PHYSICAL BLOCK ADDRESS | LOGICAL SERIAL NUMBER | |
|---|---|---|
| B0000 | LB0 | BLOCKS STORING BOOT PROGRAM |
| B0001 | LB1 | |
| B0002 | LB2 | |
| B0003 | NONE | ERASED BLOCKS |
| B0004 | NONE | |
| B0005 | LB1000 | BLOCKS STORING BACKUP PROGRAM |
| B0006 | LB1001 | |
| B0007 | LB1002 | |
| B0008 | LB8 | |
| B0009 | LB9 | |
| ⋮ | ⋮ | |
| B1022 | NONE | |
| B1023 | LB999 | |

PROGRAM-ONLY BLOCKS: B0000–B0007

USER'S PURPOSE BLOCKS: B0008–B1023

MEMORY CONTROLLER, FLASH MEMORY SYSTEM, AND CONTROL METHOD OF FLASH MEMORY

BACKGROUND OF THE INVENTION

1. Field of the Invention

The present invention relates to a memory controller, a flash memory system having the memory controller, and a control method of a flash memory.

2. Description of the Related Art

In recent years, the performances (storage capacity, reliance, operation speed, etc.) of flash memories have been improving. Therefore, it is happening that the flash memories are used for the purposes of storing programs, etc., as non-volatile storage media.

The flash memories have a risk that the data read out therefrom might include errors, due to its own characteristic. Raised as one cause for the risk is the disturb phenomenon described in, for example, Unexamined Japanese Patent Application KOKAI Publication No. 2004-272476, page 4. The disturb phenomenon is a phenomenon that when reading or writing is performed on a memory cell, the state of other memory cells that use a bit line in common with that memory cell is changed. In some cases, the disturb phenomenon causes data once written, to change over time to invite errors to mix in the data.

Thus, in a case where it is intended that an activator program (boot program) stored in a flash memory be executed when an apparatus using the flash memory as its storage medium is turned on, the program sometimes cannot be executed properly and the apparatus therefore cannot be activated.

SUMMARY OF THE INVENTION

The present invention was made in view of the above-described circumstance, and an object of the present invention is to provide a memory controller which can avoid a situation that an apparatus cannot be activated due to its boot program not being able to be executed, a flash memory having the memory controller, and a control method of a flash memory.

To achieve the above object, a memory controller according to a first aspect of the present invention is a memory controller, comprising: address managing means which manages address correspondence information indicating correspondence between logical addresses defined as addresses designated by a host system which uses a flash memory as its storage medium, and physical addresses defined as unique addresses possessed by the flash memory; writing means which writes data in the flash memory based on the address correspondence information, in response to a command from the host system; reading means which reads out data written in the flash memory based on the address correspondence information and supplying the data to the host system, in response to a command from the host system; and determination means which determines whether or not a boot program which should be executed by the host system when the host system is to be activated is properly stored in the flash memory, wherein: the flash memory stores the boot program and a backup program of the boot program; the address managing means updates the address correspondence information such that the backup program of the boot program is read out from the flash memory, in a case where the determination means determines that the boot program is not stored properly; and the reading means supplies the boot program or the backup program of the boot program to the host system based on the address correspondence information, when the host system is to be activated.

A host system indicates an apparatus that uses a flash memory as its storage medium.

In the memory controller described above, the address managing means may manage a logical address of a storage area of the boot program, and the determination means may determine that the boot program is not stored properly in the flash memory, in a case where there is no physical address that corresponds to the logical address of the storage area of the boot program in the address correspondence information retained by the address managing means.

In the memory controller described above, the reading means may comprise error correcting means which corrects errors included in data read out, limitedly up to a predetermined number of errors per page, which is a unit of reading data from the flash memory; and in a case where errors included in data read out from a page in which the boot program is stored count more than the predetermined number correctable by the error correcting means, the reading means may read out data of the backup program of the boot program which data corresponds to the data read out, from a page in which the backup program of the boot program is stored, and supplies the host system with the data read out from the page in which the backup program of the boot program is stored, instead of the data read out from the page in which the boot program is stored.

In the memory controller described above, the flash memory may comprise a program-only area for storing the boot program and the backup program of the boot program.

In the memory controller described above, in a case where the determination means determines that the boot program is not stored properly in the flash memory, the address managing means may update a physical address corresponding to a logical address of a storage area of the boot program to replace it with a physical address of a storage area of the backup program of the boot program in the address correspondence information; and the reading means may read out the backup program of the boot program based on the updated address correspondence information.

In the memory controller described above, when writing data other than the backup program of the boot program, the writing means may write in a redundant area included in each storage area in which the data is to be written, a logical serial number corresponding to a logical address of each storage area, and when writing data of the backup program of the boot program, the writing means may write in a redundant area included in each storage area in which the data is to be written, a logical serial number having no corresponding logical address of a storage area; the address managing means may manage correspondence between logical addresses and physical addresses based on the logical serial number written in the redundant area, and in a case where the determination means determines that the boot program is not stored properly in the flash memory, the address managing means may update the physical address corresponding to the logical address of the storage area of the boot program in the address correspondence information to replace it with a physical address of a storage area in whose redundant area a logical serial number having no corresponding logical address is written; and the reading means may read out the backup program of the boot program based on the updated address correspondence information.

A redundant area indicates an area for storing additional information used for managing data stored in a user area in which data used by a host system is stored.

In the memory controller described above, the writing means may also update the backup program of the boot program, when updating the boot program.

A flash memory system according to a second aspect of the present invention comprises: the memory controller according to the first aspect of the present invention; and a flash memory.

A control method of a flash memory according to a third aspect of the present invention comprises: a determining step of determining whether or not a boot program of a host system is properly stored, when the host system is to be activated; a first reading step of reading out the boot program from the flash memory, in a case where it is determined at the determining step that the boot program is stored properly; a second reading step of reading out a backup program of the boot program from the flash memory, in a case where it is determined at the determining step that the boot program is not stored properly; and a supplying step of supplying the host system with the boot program read out at the first reading step in the case where it is determined at the determining step that the boot program is stored properly, or with the backup program read out at the second reading step in the case where it is determined at the determining step that the boot program is not stored properly.

According to the present invention, the boot program and its backup program are stored in the flash memory. In a case where the boot program is not stored properly in the flash memory when a host system such as an information processing apparatus, etc. that uses the flash memory as its storage medium is to be activated, the backup program is read out from the flash memory and supplied to the host system.

Therefore, according to the present invention, it is possible to avoid a situation that an apparatus cannot be activated due to its boot program not being able to be executed.

BRIEF DESCRIPTION OF THE DRAWINGS

These objects and other objects and advantages of the present invention will become more apparent upon reading of the following detailed description and the accompanying drawings in which.

BEST MODE FOR CARRYING OUT THE INVENTION

An embodiment of the present invention will be specifically explained below based on the drawings.

[Explanation on Flash Memory System 1]

Figure 1:
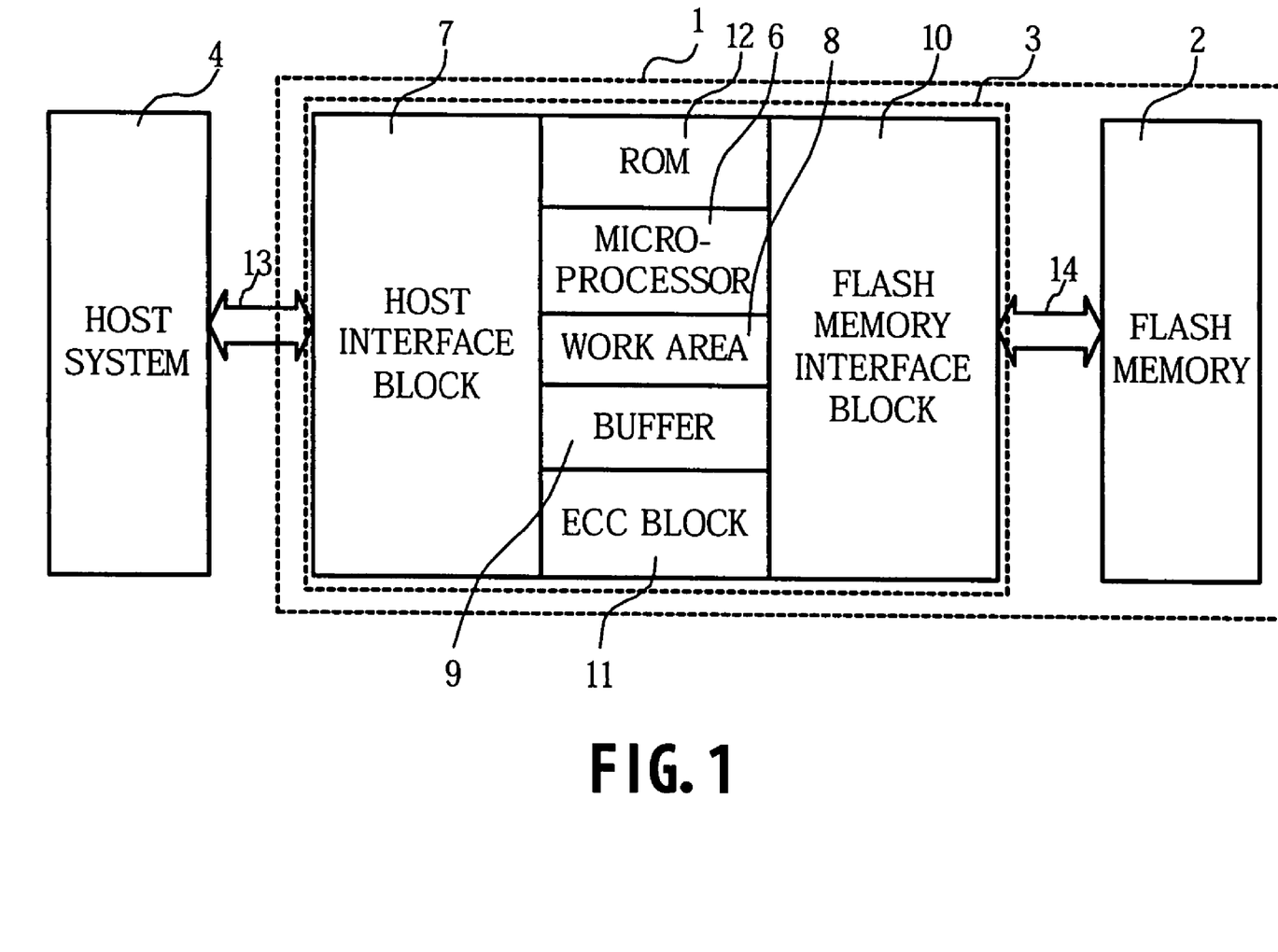
FIG. 1 is a block diagram schematically showing a flash memory system according an embodiment of the present invention.

FIG. 1 is a block diagram schematically showing a flash memory system 1 according to an embodiment of the present invention. As shown in FIG. 1, the flash memory system 1 comprises a flash memory 2 and a controller 3 for controlling this.

Note that the flash memory system 1 is connected to a host system 4 via an external bus 13. The host system 4 comprises a CPU (Central Processing Unit) for controlling the entire operation of the host system 4, a companion chip for exchanging information with the flash memory system 1, etc. The host system 4 may be an information processing apparatus of every kind, from a personal computer for processing various kinds of information such as character, audio, or image information, etc. to a digital still camera.

As shown in FIG. 1, the controller (memory controller) 3 comprises a microprocessor 6, a host interface block 7, a work area 8, a buffer 9, a flash memory interface block 10, an ECC (Error Correction Code) block 11, and a ROM (Read Only Memory) 12. The controller 3 comprising these functional blocks is integrated on one semiconductor chip. Each functional block will be explained below.

The microprocessor 6 controls the entire operation of the controller 3 in accordance with a program stored in the ROM 12. Specifically, the microprocessor 6 controls each block to perform a writing process of writing data on the flash memory 2, a reading process of reading data from the flash memory 2, an address translation table generation process, an erased block search table generation process, etc.

The host interface block 7 exchanges data, address information, status information, external command information, etc. with the host system 4. To be more specific, the flash memory system 1 and the host system 4 are connected to each other via the external bus 13. In this state, data, etc. to be supplied from the host system 4 to the flash memory system 1 are acquired into the controller 3 from the host interface block 7 as the entrance, while data, etc. to be supplied from the flash memory system 1 to the host system 4 are supplied to the host system 4 through the host interface block 7 as the exit.

More specifically, the host interface block 7 has a command register for temporarily storing a host address and an external command supplied from the host system 4, a sector number register for storing the size of data to be written or read, a logical address register for storing a logical sector address for specifying the sector of the data to be written or read, etc. The host interface block 7 performs information exchanges with the host system 4 via these registers.

The work area 8 is a working space in which data necessary for controlling the flash memory 2 is temporarily stored, and is made up of a plurality of SRAM (Static Random Access Memory) cells.

The buffer 9 temporarily retains data read out from the flash memory 2 and data to be written on the flash memory 2.

The flash memory interface block 10 exchanges data, address information, status information, internal command information, etc. with the flash memory 2, via an internal bus 14.

The ECC block 11 generates an error correction code to be added to the data which is to be written on the flash memory 2. Further, the ECC block 11 detects and corrects any error included in read-out data, based on the error correction code added to the read-out data.

The ROM 12 is a non-volatile storage element for storing programs that define the procedures of the processes performed by the microprocessor 6. Specifically, the ROM 12 stores programs defining the procedures of, for example, the writing process, the reading process, the address translation table generation process, the erased block search table generation process, etc.

[Explanation on Flash Memory]

Figure 2:
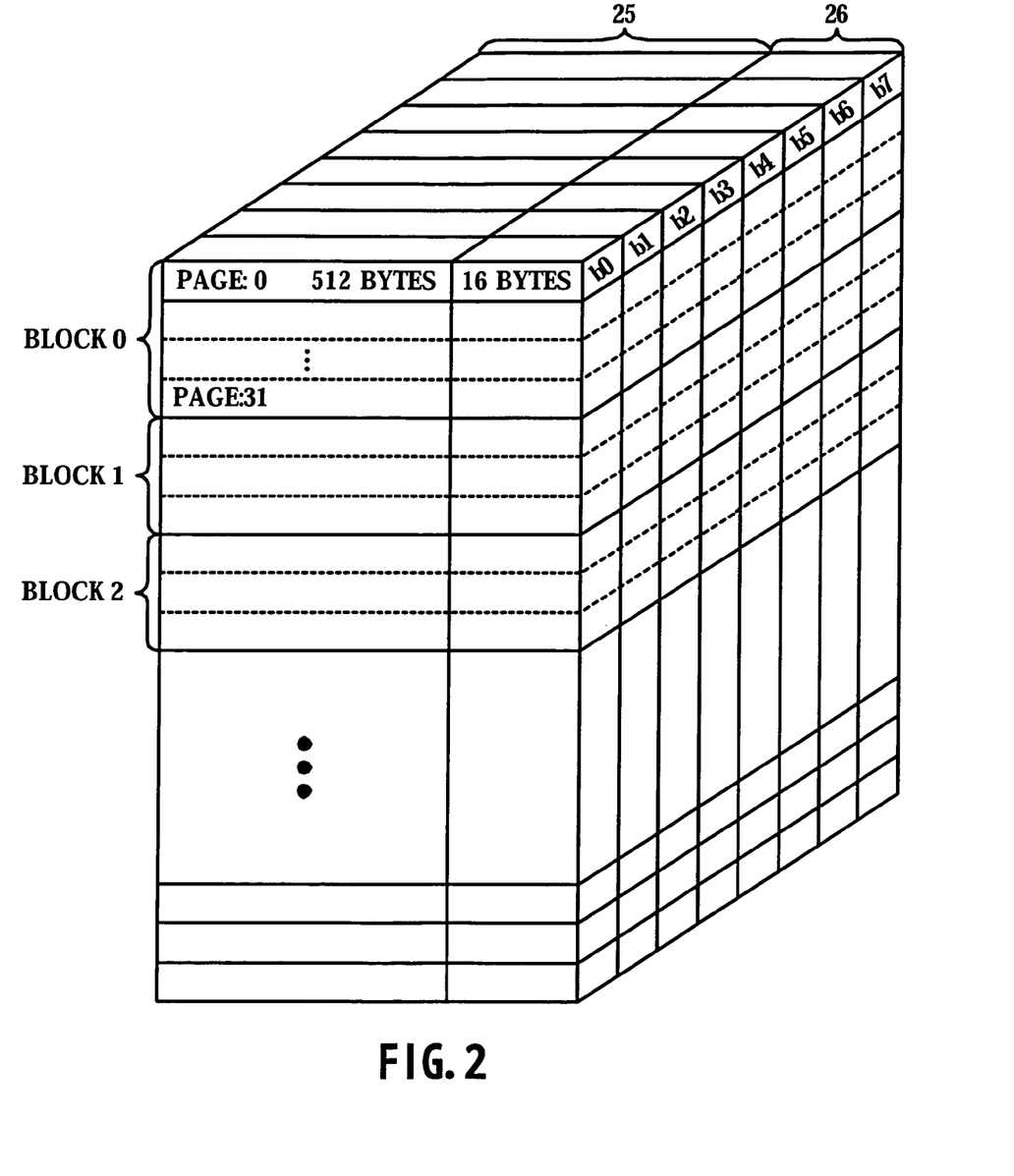
FIG. 2 is a diagram schematically showing the structure of an address space of a flash memory.

Next, the flash memory 2 will be explained. FIG. 2 is a diagram schematically showing the memory structure of the flash memory 2. As shown in FIG. 2, the flash memory 2 is made up of pages as the process unit in data reading and writing, and blocks (physical blocks) as the data erasing unit.

The page comprises a user area 25 having 512 bytes, and a redundant area 26 having 16 bytes. The user area 25 is an area in which mainly data supplied from the host system 4 is stored, and the redundant area 26 is an area in which additional information such as an error correction code, a block status, a logical serial number, etc. is stored. According to the present embodiment, 512-byte data is stored in one sector, and one page has the user area 25 that amounts to one sector.

The physical blocks are assigned physical block addresses unique to themselves. On the other hand, the address space of the host system 4 is managed by serial logical sector addresses which are assigned to areas divided in the sector unit. Further, a group of a plurality of sectors is called logical block, and serial numbers assigned to the logical blocks are called logical block addresses. The logical block address can be specified based on the logical sector address. For example, according to the present embodiment, since thirty-two sectors are made into one logical block, a logical block address can be specified by a quotient obtained by dividing a logical sector address by 32.

An error correction code is additional information for correcting errors included in the data stored in the user area 25, and is generated by the ECC block 11. Based on the error correction code, the errors included in the data stored in the user area 25 are corrected if the number of errors is equal to or smaller than a predetermined number.

A block status is a flag indicating whether the block concerned is a defective block or not. In a case where the block is determined as a defective block, a flag indicating that the block is a defective block is set. A defective block is a block in which data writing, etc. cannot be performed properly.

A logical serial number indicates to which logical block address a block concerned corresponds, in a case where the block stores data.

The flash memory 2 according to the present embodiment includes a block that is assigned a logical serial number having no corresponding logical block address. A backup program of a boot program is stored in the user area 25 of the block assigned the logical serial number having no corresponding logical block address.

It is possible to determine whether a block concerned is an erased block or not depending on whether a logical serial number is stored or not, since no logical serial number is stored in a case where no data is stored in the block. That is, in a case where no logical serial number is stored in a block, the block can be determined as an erased block.

[Explanation on Logical Block Address and Physical Block Address]

The flash memory 2 does not take data overwriting. Therefore, in a case where data rewriting is to be performed on the flash memory 2, a two-step process has to be performed such that new data (data after rewriting) is written in an erased block which has been erased block-wise, and the block in which the old data (data before rewriting) has been written is erased. At this time, since erasing is done in the block unit, the data in all the pages in the block including the page in which the old data (data before rewriting) has been written are erased. Accordingly, in the case where data rewriting is to be performed, a process is necessary for also moving the data in the other pages in the block including the page to be rewritten to an erased block.

In a case where data is to be rewritten in the way described above, the data after rewriting is written in a block different from that before rewriting. Therefore, the correspondence between the logical block addresses specified based on the logical sector addresses supplied from the host system 4 and the physical block addresses as the block addresses in the flash memory 2 changes dynamically each time data is rewritten. Thus, an address translation table indicating the correspondence between the logical block addresses and the physical block addresses is necessary. The address translation table is generated based on the logical serial numbers written in the redundant areas 26 of the flash memory, and the correspondence between those involved in data rewriting is updated each time data is rewritten.

[Explanation on Zone Structure]

Figure 3:
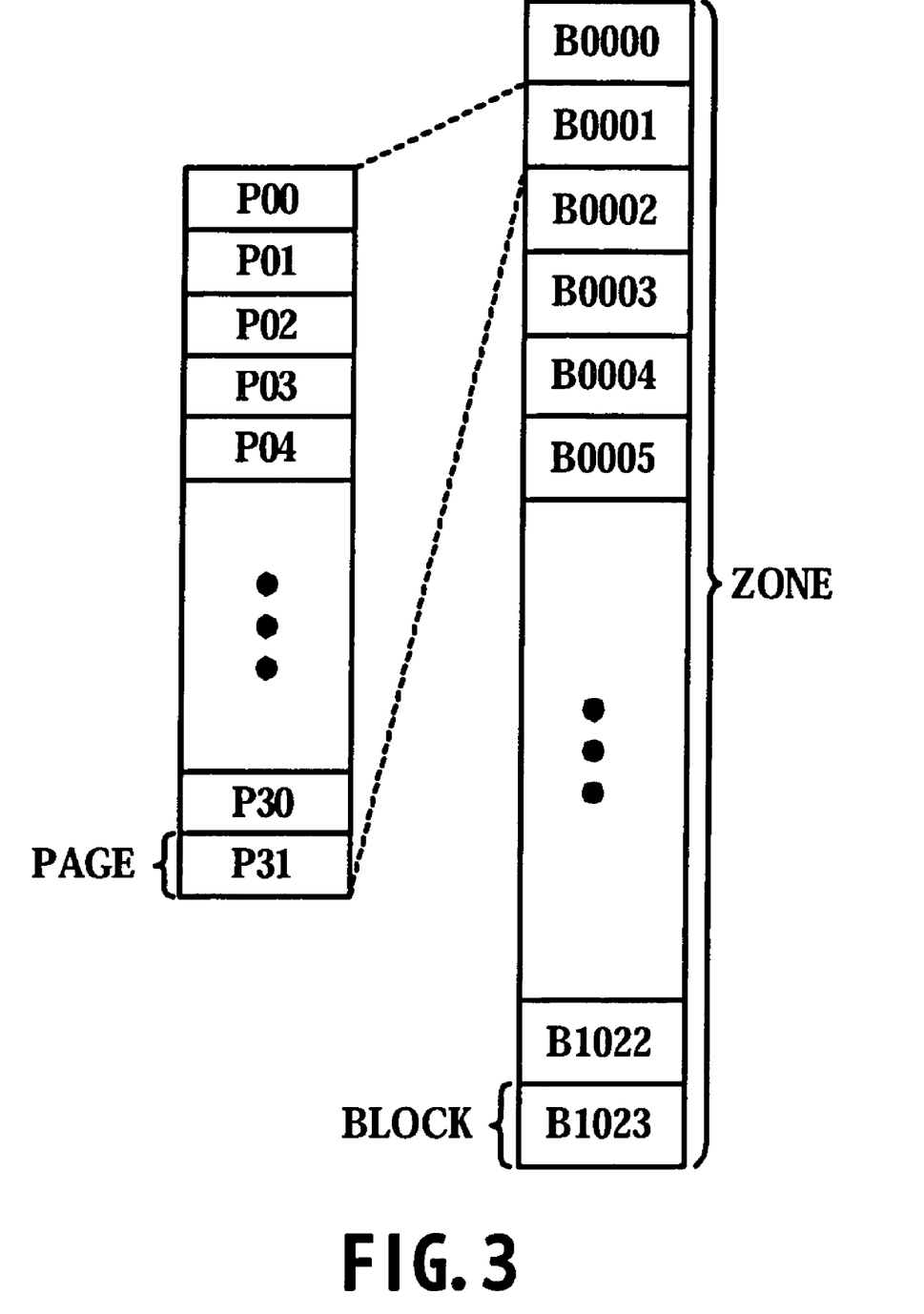
FIG. 3 is a diagram showing an example that a zone is made up of 1,024 blocks.

Next, zone management for assigning zones made up of a plurality of blocks in the flash memory 2 to a space of logical block addresses will be explained with reference to the drawings. FIG. 3 shows an example that one zone is made up of 1,024 blocks. In the example shown in FIG. 3, the zone includes 1,024 blocks B000 to B1023 (physical block addresses of 0000 to 1023), and each block includes 32 pages P00 to P31, which are the unit of reading and writing processes. Here, the block is the unit of an erasing process, and the page is the unit of reading and writing processes.

In the case where the zone is to be assigned to a space of logical block addresses, it is assigned to a space of logical block addresses for a less number of blocks than the number of blocks included in the zone. This assignment is normally done in accordance with the specifications of the flash memory 2. For example, a zone including 1,024 blocks can be assigned to a space of logical block addresses for 1,000 blocks, or to a space of logical block addresses for 950 blocks. At this time, if the number of blocks included in the space of logical block addresses to be assigned to the zone is increased, the utilization efficiency of the flash memory is improved but the tolerance for the generation of defective blocks (the tolerable number of defective blocks generated) is decreased.

Figure 4:
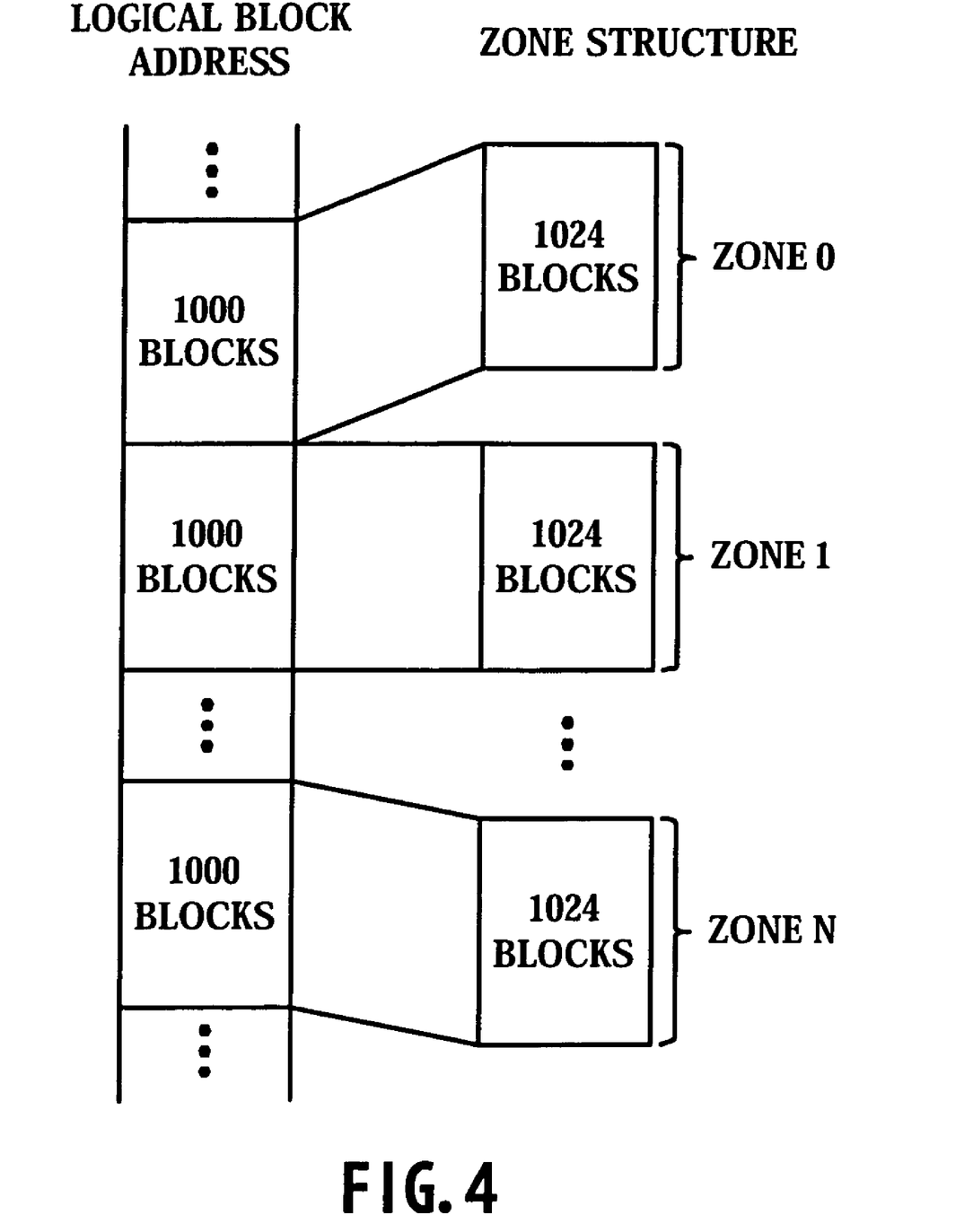
FIG. 4 is a diagram showing an example of assignment of zones.

As shown in FIG. 4, in the flash memory system 1 according to the present embodiment, it is assumed that a zone including 1,024 blocks is assigned to a space of logical block addresses for 1,000 blocks. Note that the logical serial numbers are the serial numbers of the logical blocks in the zone.

Figure 5:
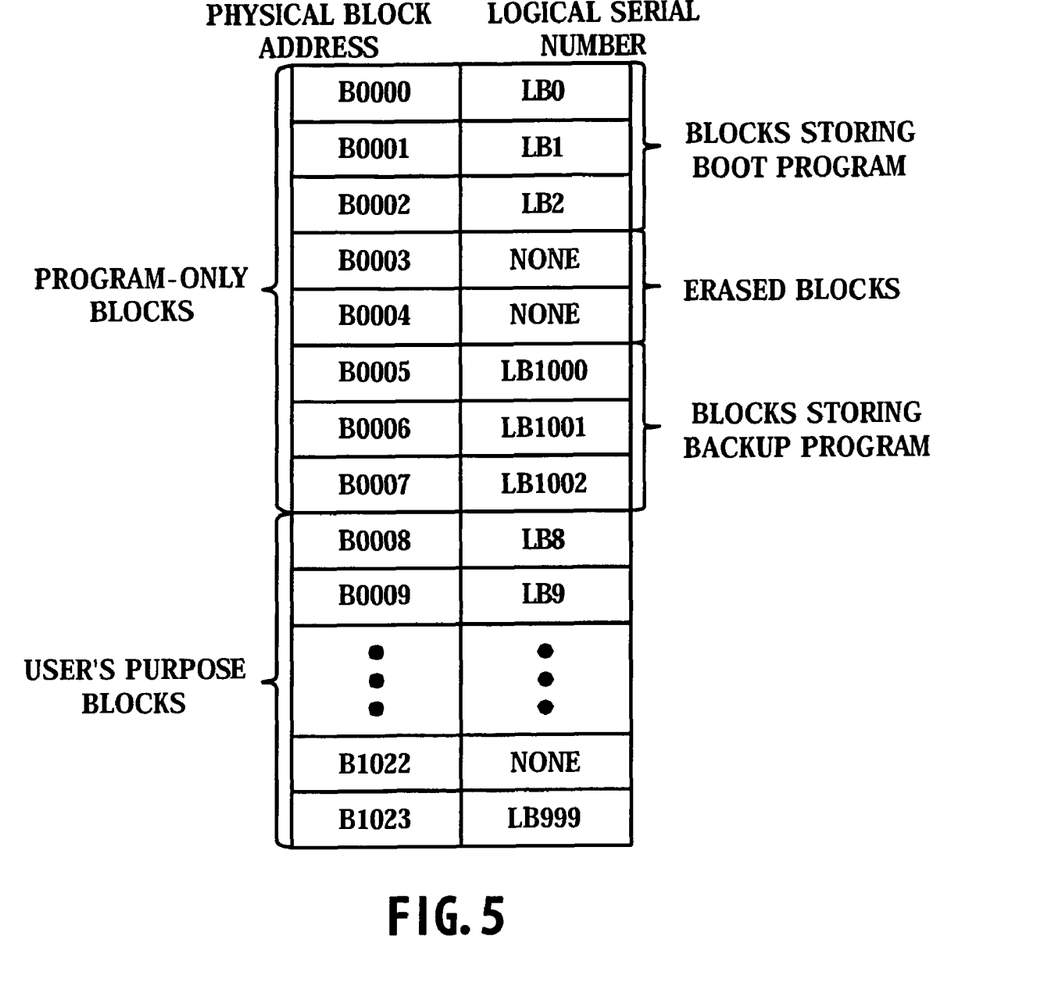
FIG. 5 is a diagram showing an example of assignment of blocks making up a zone.

Further, in the flash memory 2 according to the present embodiment, the first 8 blocks (B0000 to B0007) of the zone including 1,024 blocks are special purpose blocks (hereinafter referred to as program-only blocks) for storing the boot program to be executed when the host system 4 is to be activated and its backup program, and the remaining blocks are blocks (hereinafter referred to as user's purpose blocks) in which the user can freely write data, as shown in FIG. 5.

The size of the program-only blocks may not be limited to 8 blocks, unless it adds up to more than 1,024 blocks together with the user's purpose blocks. Further, the program-only blocks may be assigned to the portions other than the head portion of the zone.

A predetermined logical serial number that has a corresponding logical block address is written in the redundant area 26 of the block in which the boot program is written, among the program-only blocks. In the example shown in FIG. 5, the blocks (B0000 to B0002) storing the boot program among the program-only blocks are assigned logical serial numbers LB0 to LB2 respectively.

Further, a predetermined logical serial number having no corresponding logical block address is written in the redundant area 26 of the block in which the backup program is written, among the program-only blocks. In the example shown in FIG. 5, the blocks (B0005 to B0007) storing the backup program among the program-only blocks are assigned logical serial numbers LB1000 to LB1002 respectively.

Note that in the example shown in FIG. 5, B0003 and B0004 among the program-only blocks are assigned no corresponding logical serial numbers. These blocks are erased blocks, and used in rewriting the program.

Since the boot program and its backup program can be identified by the logical serial numbers as described above, these programs may be stored with the blocks in the zone not divided into the program-only blocks and the user's purpose blocks.

[Explanation on Address Translation Table]

Next, the address translation table will be explained. The address translation table manages the correspondence between logical addresses defined on the side of the host system 4, and physical addresses defined on the side of the flash memory 2. To be more specific, the address translation table manages the correspondence between the logical block address as one of the logical addresses, and the physical block address as one of the physical addresses.

Figure 6:
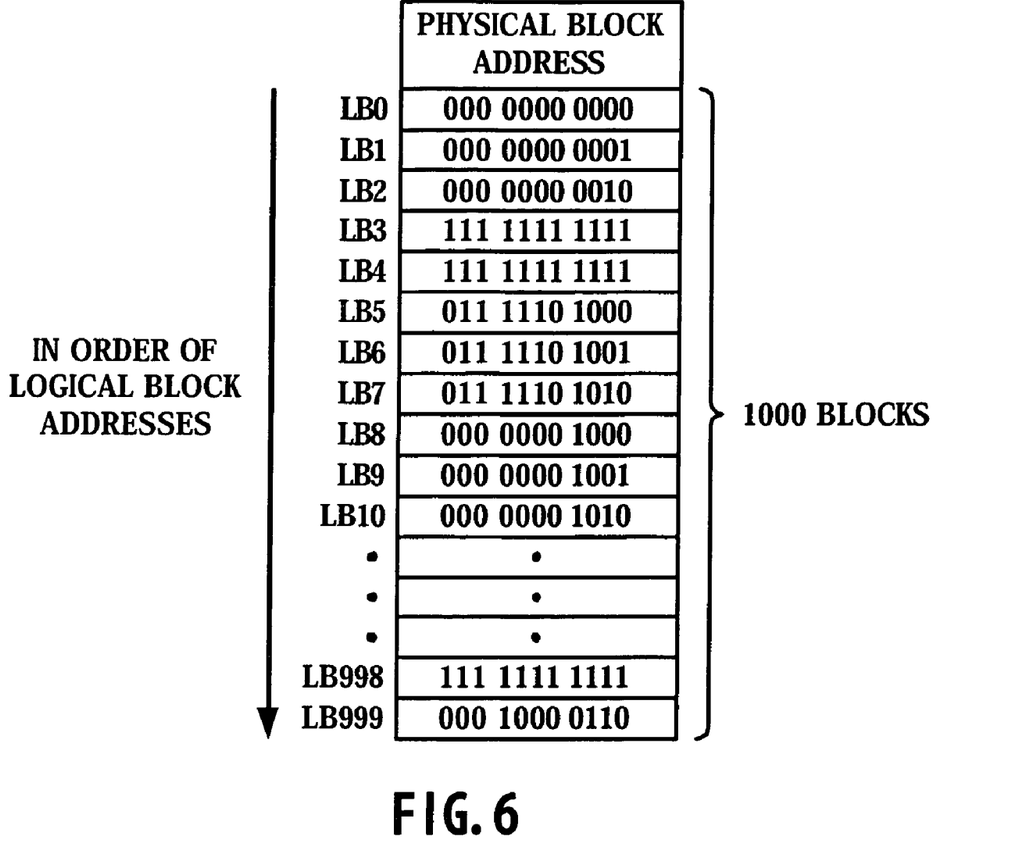
FIG. 6 is a diagram showing an example of an address translation table.

FIG. 6 shows one example of the address translation table for the zone 0 shown in FIG. 4. As shown in FIG. 6, physical block addresses in the flash memory 2, at which data corresponding to the respective logical block addresses are stored, are indicated on the address translation table in the order of logical block addresses. For any logical block address for which no corresponding data is stored, not a physical block address but a flag indicating that no data is stored is set at the portion corresponding to that logical block address in the address translation table. Hereinafter, the flag indicating that no corresponding data is stored will be referred to as no-storage flag. According to the present embodiment, a group of bits that are all set to 1 is used as the no-storage flag to replace the physical block address. In the example shown in FIG. 6, no-storage flags are set at LB3, LB4, and LB998.

In the space of logical block addresses assigned to each zone, the logical serial numbers are assigned to the respective blocks in the order of logical block addresses. That is, in the case where the space of logical block addresses for 1,000 blocks is assigned to each zone as described above, logical serial numbers of LB0 to LB999 are assigned to the respective logical block addresses in the order of the logical block addresses. Here, the logical serial number LB0 corresponds to the logical block address at the head of the space of logical block addresses for 1,000 blocks, and the logical serial number LB999 corresponds to the 1000th logical block address in the space of logical block addresses for 1,000 blocks. Accordingly, there are no corresponding logical block addresses for the logical serial number LB1000 and thereafter.

The procedures for generating the address translation table are as follows. For example, in a case where the address translation table for the zone 0 shown in FIG. 4 is to be generated, the microprocessor 6 secures an area in the SRAM in which physical block addresses for 1,000 blocks can be written, and sets no-storage flags as the initial setting in the area to write the physical block addresses in. After that, the microprocessor 6 controls the flash memory interface block 10 to sequentially read the redundant areas 26 of the blocks constituting the zone 0 of the flash memory 2. In a case where a logical serial number is written in a redundant area 26, the microprocessor 6 writes the physical block address of the block in which that logical serial number is written, in the portion of the address translation table that corresponds to the logical serial number.

The no-storage flag written as the initial setting is left unchanged in the portions where no physical block address is written in the address translation table generation process.

[Explanation on Erased Block Search Table]

Next, an erased block search table will be explained with reference to the drawings. The erased block search table is a table for searching any erased block that can be the destination of data writing.

First, a method of searching an erased block by using the erased block search table will be explained. For example, in a case where any erased block in the zone shown in FIG. 4 is to be searched, the microprocessor 6 secures an area of 1,024 bits in the SRAM, and generates an erased block search table on which the blocks constituting the zone are assigned to the bits of the area respectively.

Figure 7:
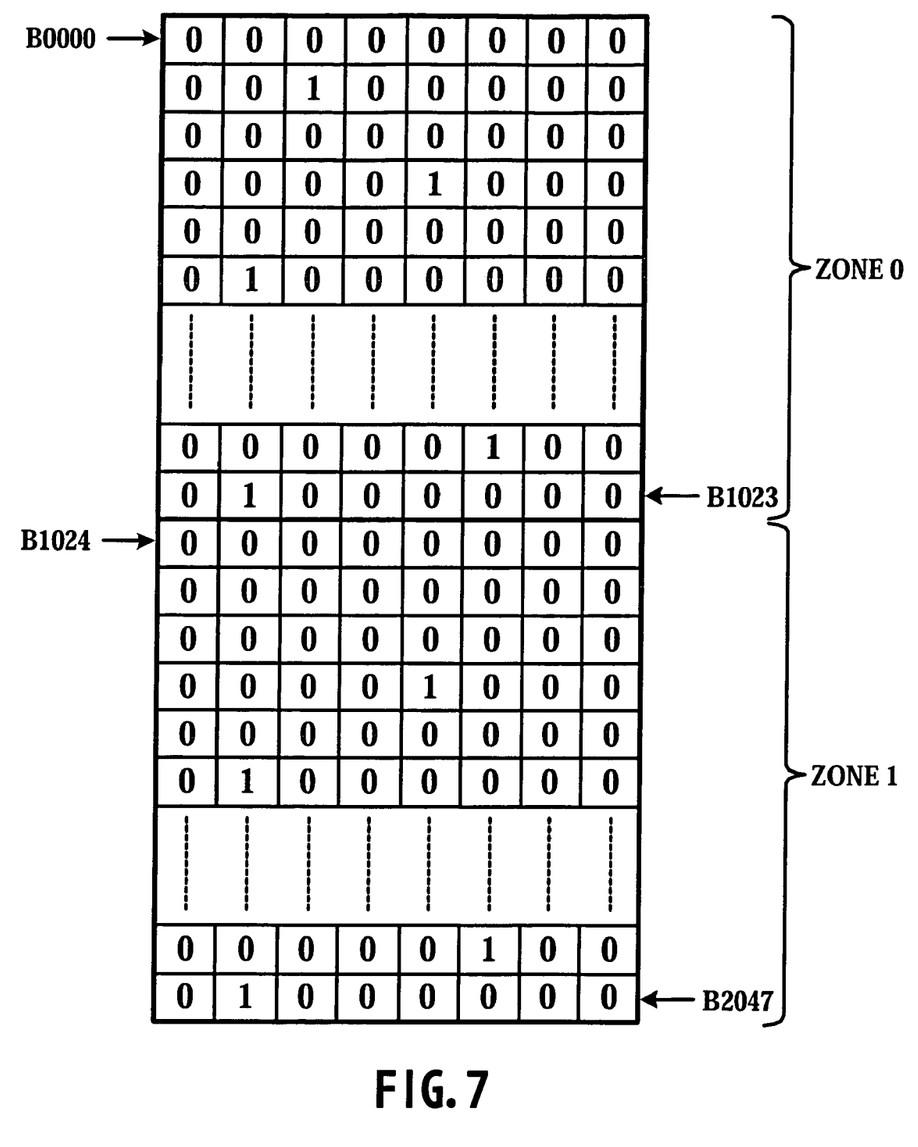
FIG. 7 is a conceptual diagram showing an example of an erased block search table.

FIG. 7 is a conceptual diagram exemplarily showing the erased block search tables for the zone 0 and zone 1 shown in FIG. 4. Here, the bits on the erased block search table for the zone 0 correspond to the blocks B0000 to B1023 (physical block addresses 0000 to 01023), and the bits on the erased block search table for the zone 1 correspond to the blocks B1024 to B2047 (physical block addresses 1024 to 2047).

The correspondence between the bits on the erased block search table and the blocks constituting a zone is such that bits on the erased block search table shown in FIG. 7 that are arranged on upper rows and more leftward in each row correspond to smaller physical block addresses and bits that are arranged on lower rows and more rightward in each row correspond to larger physical block addresses. Accordingly, in the erased block search table for the zone 0, the uppermost leftmost bit corresponds to the block B0000 (physical block address 0000), and the lowermost rightmost bit corresponds to the block B1023 (physical block address 1023).

The bits on the erased block search table indicate whether it is an erased block or not by "0" and "1". For example, in a case where data is written in a block, "0" is set to the bit corresponding to that block, and in a case where no data is written in a block (in a case where the block is an erased block), "1" is set to the bit corresponding to that block. Further, "0" is also set for the bit corresponding to a block in which a block status indicative of a defective block is written.

The erased block search table can be generated simultaneously when the address translation table is generated. For example, the microprocessor 6 presets "0" in the area on the SRAM where the erased block search table is to be generated. When neither logical serial number nor block status representative of a defective block are written in the redundant area 26 of the blocks, the microprocessor 6 sets "1" to the bits corresponding to such blocks. In this manner, the microprocessor 6 generates the erased block search table together with generating the address translation table. That is, if this process is performed when the data written in the redundant areas 26 of the blocks constituting the zone are read out, "1" is set to only the bits corresponding to the erased blocks, and the bits corresponding to blocks that are not the erased blocks remain "0" as set beforehand.

When data is written in an erased block, the microprocessor 6 changes the bit corresponding to that block from "1" to "0", and when a block in which data is written is block-erased, it changes the bit corresponding to that block from "0" to "1", thereby the erased block search table is updated as needed.

Figure 8:
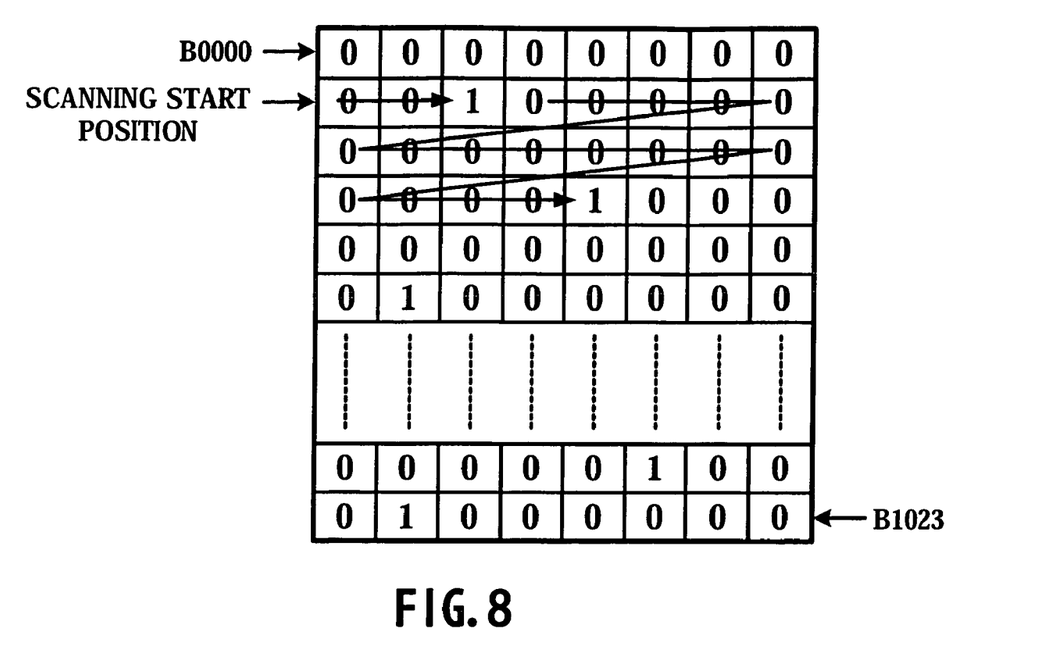
FIG. 8 is a diagram for explaining an erased block searching method using the erased block search table.

Next, a case where an erased block is searched from the user's purpose blocks with the use of the erased block search table will be explained with reference to FIG. 8. FIG. 8 shows the erased block search table for the zone 0. For example, the bits on the first row correspond to the blocks B0000 to B0007 (physical block addresses 0000 to 0007), and the bits on the lowermost row correspond to the blocks B1016 to B1023 (physical block addresses 1016 to 1023).

The microprocessor 6 scans the erased block search table from the upper rows to the lower rows. Further, the microprocessor 6 scans each row of the erased block search table from the left to the right. To be more specific, since the bits on the topmost row of the erased block search table correspond to the program-only blocks, the microprocessor 6 starts the scanning from the bit (the leftmost bit on the second row) corresponding to the block B0008 (physical block address 0008) on the erased block search table. Then, the microprocessor 6 carries out the scanning up to the bit (the rightmost bit on the lowermost row) corresponding to the block B1023 (physical block address 1023) to search out a bit indicating "1" corresponding to an erased block.

On the erased block search table shown in FIG. 8, the bit on the second row from the top at the third order from the left is "1". Thus, the microprocessor 6 finishes the search at this bit, and specifies the block B0010 (physical block address 0010) corresponding to this bit as the block of the data writing destination.

For the next search, the microprocessor 6 starts the scanning from the bit on the second row from the top at the fourth order from the left. Then, the microprocessor 6 finishes searching at the bit indicating "1" on the fourth row from the top at the fifth order from the left, and specifies the block B0028 (physical block address 0028) corresponding to this bit as the block of the data writing destination. After that, searching in this manner is continued, and returned to the leftmost bit on the second row when the scanning reaches the rightmost bit on the lowermost row.

In a case where an erased block is searched in the program-only blocks, searching similar to that described above may be performed for the first row of the erased block search table.

[Explanation on Writing Process]

Next, a writing process to be executed in response to a command from the host system 4 will be explained. In the writing process, data writing on the flash memory 2 will be executed.

A command from the host system 4 for demanding execution of the writing process is written on the command register of the host interface block 7. The logical sector address of the data writing destination and the size of the data to be written are written on the logical address register and sector number register of the host interface block 7 respectively.

In response to the command written on the command register, the microprocessor 6 writes the data in a block specified by searching the erased block search table. In this writing process, the microprocessor 6 controls the flash memory interface block 10 to write the data in the page of the writing destination block via the internal bus 14. The microprocessor 6 writes an error correction code, a logical serial number, etc. in the redundant area 26 of the block in which the data has been written.

Further, in a case where in the above-described writing process, a block in which corresponding old data is stored exists at the logical block address specified based on the logical sector address supplied from the host system 4, the old data stored in that block will be erased. The erasing of the old data will be performed after the above-described writing of the new data is completed. The physical block address of the block in which the old data to be erased is stored can be obtained based on the address translation table. In this erasing process, the microprocessor 6 controls the flash memory interface block 10 to erase, via the internal bus 14, the data at the physical block address of the block in the flash memory 2, in which the old data is stored.

In a case where the boot program written in the program-only blocks is to be updated, the boot program is rewritten according to the above-described procedures, and the backup program is also updated. Note that the backup program cannot be updated by designating any logical address from the host system 4. Accordingly, when a command demanding updating of the boot program is given, the microprocessor 6 updates the boot program, and further writes the boot program at another physical block address and writes a logical serial number indicating that a backup program is stored, in the redundant area 26 of that block.

[Explanation on Reading Process]

A reading process is executed in response to a command from the host system 4.

A command from the host system 4 for demanding execution of a reading process is written on the command register of the host interface block 7. Further, the logical sector address of the data to be read out that is supplied from the host system 4 is written on the logical address register of the host interface block 7, and the size of the data to be read out is written on the sector number register.

In response to the command written on the command register, the microprocessor 6 translates the logical block address specified based on the logical sector address written on the logical address register to a physical block address based on the address translation table. Specifically, the microprocessor 6 translates the logical block address to a physical block address of the block in which the data corresponding to that logical block address is stored.

Successively, the microprocessor 6 controls the flash memory interface block 10 to read out, via the internal bus 14, the data stored in the page of the block which is assigned the physical block address obtained by the translation into the buffer 9.

The microprocessor 6 corrects any error in the data read out into the buffer 9 based on the error correction code added to the data. Then, the microprocessor 6 controls the host interface block 7 to supply the corrected data to the host system 4 via the external bus 13. The microprocessor 6 performs these procedures repeatedly, correspondingly to the number of pages written on the sector number register, and thereafter finishes the reading process.

[Explanation on Boot Process]

Next, procedures of a boot process to be executed by the boot program stored in the flash memory 2 being read out when the host system 4 is to be activated, will be explained with reference to the flowchart shown in FIG. 9.

The boot process is performed when, for example, the host system 4 is turned on or the host system 4 is reset.

Once the boot process is started, the microprocessor 6 of the controller 3 accesses the flash memory 2 via the flash memory interface block 10 and the internal bus 14. Then, the microprocessor 6 generates an address translation table for the zone in which the boot program must be stored, in the work area 8 (step S100).

Next, the microprocessor 6 determines whether the boot program is stored properly or not, by using the generated address translation table (step S110). Specifically, the microprocessor 6 determines whether or not there are such physical block addresses as corresponding to the logical block addresses that are assigned to the storage areas of the boot program, by referring to the address translation table generated at step S100. Since the logical block addresses are assigned logical serial numbers in each zone as described above, the above-described determination can be made according to whether or not there are any physical block addresses in the zone, that correspond to the logical serial numbers assigned to the storage areas of the boot program.

For example, in a case where errors are mixed in the data in the redundant areas 26 of the blocks in which the boot program is stored and the logical serial numbers cannot be read out from the redundant areas 26, no-storage flags are set at portions on the address translation table that correspond to the logical serial numbers of the boot program. In such a case, there are no physical block address on the address translation table that correspond to the logical serial numbers of the boot program, thus it is determined at step S110 that the boot program is not stored properly.

In a case where the logical serial numbers LB0 to LB2 are assigned to the storage areas of the boot program and the logical serial numbers LB1000 to LB1002 are assigned to the storage areas of the backup program, and there exist physical block addresses that correspond to the logical serial numbers LB0 to LB2 on the address translation table (step S110; Yes), the microprocessor 6 moves the process to step S130.

To the contrary, in a case where there are no physical block addresses that correspond to the logical serial numbers LB0 to LB2 on the address translation table (step S110; No), the microprocessor 6 rewrites the address translation table (step S120). In this rewriting, the physical block addresses at which the backup program is stored are written at the portions on the address translation table, that correspond to the logical serial numbers of the boot program.

Specifically, the microprocessor 6 sequentially reads the redundant areas 26 in the blocks assigned to the program-only blocks, and obtains the physical block addresses of the blocks in whose redundant areas 26 the logical serial numbers LB1000 to LB1002 are written.

The microprocessor 6 writes the physical block addresses corresponding to the logical serial numbers LB1000 to LB1002 assigned to the storage areas of the backup program, at the portions on the address translation table that correspond to the logical serial numbers LB0 to LB2. That is, the microprocessor 6 writes the physical block address at the portion corresponding to the logical serial number LB1000 at the portion corresponding to the logical serial number LB0 on the address translation table. The microprocessor 6 writes the physical block address at the portion corresponding to the logical serial number LB1001 at the portion corresponding to the logical serial number LB1 on the address translation table. Further, the microprocessor 6 writes the physical block address at the portion corresponding to the logical serial number LB1002 at the portion corresponding to the logical serial number LB2 on the address translation table. After that, the microprocessor 6 moves the process to step S130.

Note that in a case where it is determined at step S110 that only one logical serial number among the logical serial numbers LB0 to LB2 has no corresponding physical block address existing on the address translation table, only the portion corresponding to the logical serial number having no physical block address may be replaced with the physical block address at which the backup program is stored.

At step S130, the microprocessor 6 reads out the boot program or its backup program from the flash memory 2 based on the address translation table (step S130). That is, the boot program is read out in a case where the physical block addresses corresponding to the logical serial numbers LB0 to LB2 are written at the portions corresponding to the logical serial numbers LB0 to LB2 on the address translation table, and the backup program is read out in a case where the physical block addresses corresponding to the logical serial numbers LB1000 to LB1002 are written there. The boot program or its backup program that has been read out is written on a RAM (Random Access Memory) in the host system 4. An SRAM area directly accessible by the host system 4 may be prepared in the controller 3, and the boot program or its backup program having been read out may be written therein.

The host system 4 executes the boot program or its backup program, and realizes a desired operation (step S140).

As explained above, the flash memory system 1 according to the present embodiment has the boot program and its backup program stored in the flash memory 2, and reads out the boot program or its backup program from the flash memory 2 based on the address translation table generated when the host system 4 is to be activated. The host system 4 executes the boot program or its backup program having been read out to realize a desired operation.

Here, the areas in which the backup program is stored are assigned no address spaces of the host system 4, i.e., no areas of logical block addresses. Thus, the host system 4 always demands a reading process by designating the logical addresses of the areas in which the boot program is stored. This reading process is performed based on the address translation table. Therefore, the boot program is read out in a case where the physical block addresses of the areas in which the boot program is stored are written at the portions on the address translation table that correspond to the areas at which the boot program is stored, and the backup program is read out in a case where the physical block addresses of the areas in which the backup program is stored are written there.

In a case where it is determined when the address translation table is to be generated that the boot program is not stored properly, the physical block addresses of the areas in which the backup program is stored are written at the portions on the address translation table that correspond to the areas in which the boot program is stored. Accordingly, even in the case where the boot program is not stored properly, the host system 4 can read out the backup program without carrying out any special process, and execute the backup program.

According to the above-described explanation, the backup program is read out by the address translation table being rewritten at the time of activation. However, in a case where it becomes unable, while the boot program is being read out, to correct errors included in a page having been read out (for example, in a case where errors in excess of the tolerable number correctable are detected by the ECC block 11), only the data stored in that page may be replaced with corresponding stored data of the backup program.

For example, in a case where the logical serial numbers LB0 to LB2 are assigned to the storage areas of the boot program and the logical serial numbers LB1000 to LB1002 are assigned to the storage areas of the backup program respectively as described above, if the boot program is stored properly, the physical block addresses corresponding to the logical serial numbers LB0 to LB2 are written at the portions on the address translation table that correspond to the logical serial numbers LB0 to LB2. Accordingly, the stored data are read out from the blocks designated by the physical block addresses corresponding to the logical serial numbers LB0 to LB2. In a case where it becomes unable to correct errors included in a page having been read out while the stored data are sequentially read out from the pages in the blocks designated by the physical block addresses corresponding to LB0 to LB2, the data stored in that page is replaced with the data stored in a corresponding page of the backup program. For example, if the page at which it becomes unable to correct errors is the tenth page of the block designated by the physical block address corresponding to the logical serial number LB0, the data stored in that page is replaced with the data stored in the tenth page of the block designated by the physical block address corresponding to the logical serial number LB1000. Note that it is assumed that the correspondence between the boot program and the backup program is set such that the logical serial number LB0 and the logical serial number LB1000 correspond, the logical serial number LB1 and the logical serial number LB1001 correspond, and the logical serial number LB2 and the logical serial number LB1002 correspond.

Figure 10:
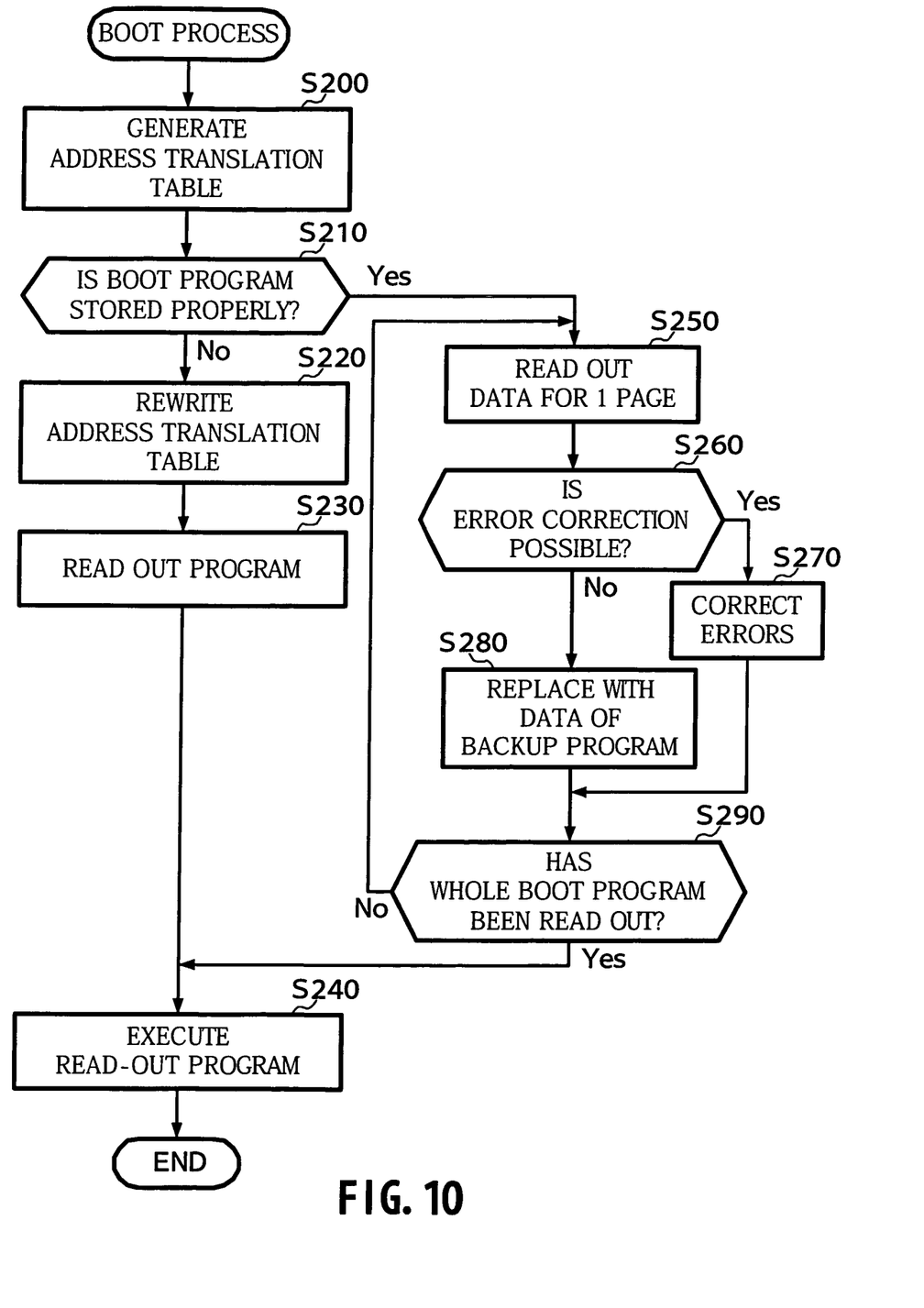
FIG. 10 is a flowchart for explaining another example of procedures of the boot process.

FIG. 10 is a flowchart for explaining an example of procedures of the boot process of the case where data for which error correction is not available is replaced with the data of the backup program.

Figure 9:
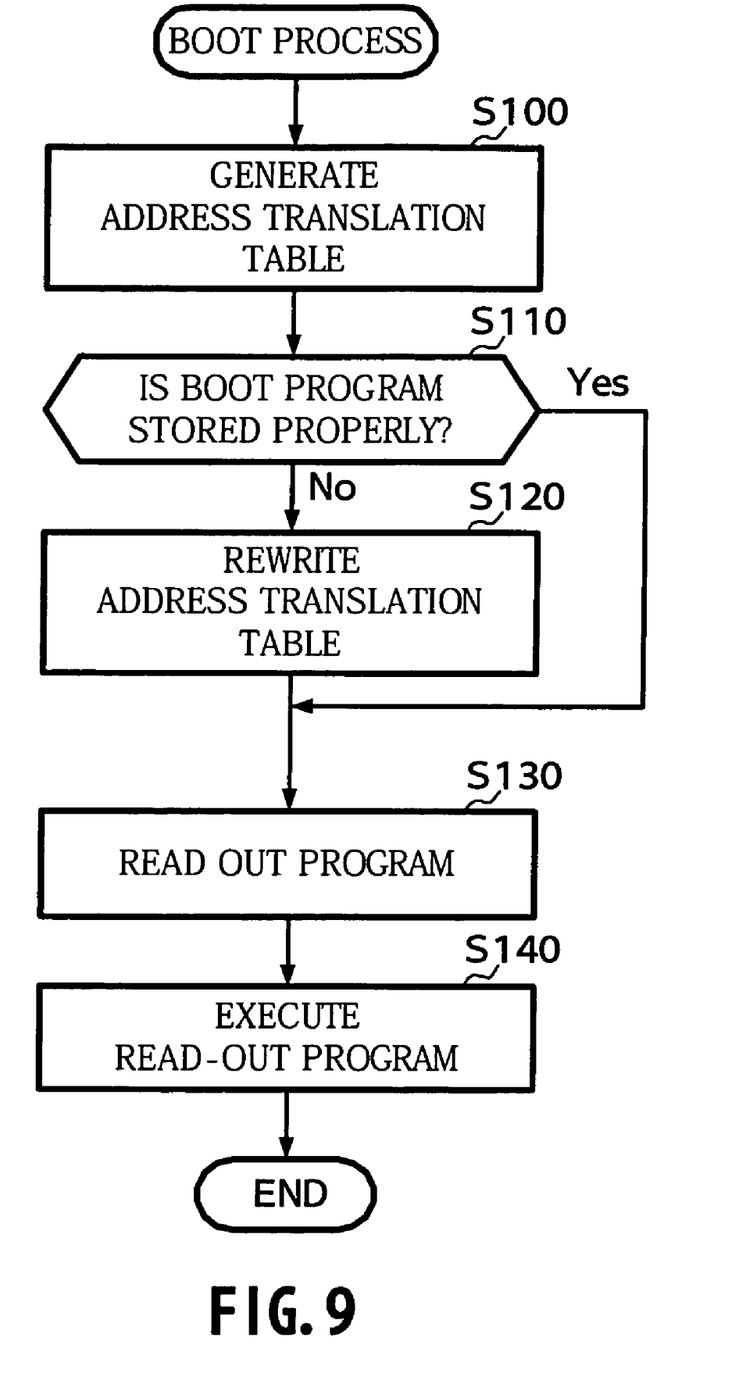
FIG. 9 is a flowchart for explaining an example of procedures of a boot process.

The boot process shown in FIG. 10 is different from the boot process shown in FIG. 9 in a process of a case where it is determined that the boot program is stored properly. The processes at steps S210 to S240 of FIG. 10 are the same as the processes at steps S110 to S140 of FIG. 9, and explanation for these processes will thus be omitted.

In a case where it is determined at step S210 that the boot program is stored properly (step S210; Yes), the microprocessor 6 reads out data amounting to one page from the plurality of blocks in which the boot program is stored (step S250). Specifically, the microprocessor 6 first reads out the data in the head page of the block specified by the physical block address corresponding to the logical serial number LB0 into the buffer 9 and the ECC block 11.

Next, the ECC block 11 determines whether or not it can correct errors in the data read out (step S260). Specifically, the microprocessor 6 determines whether or not the number of errors included in the data stored in the user area 25 of the read-out page is equal to or smaller than a predetermined number, based on the error correction code stored in the redundant area 26 of the read-out page. For example, in a case where the error correction code is a humming code, and errors amounting to 2 bits in the 512-byte data can be corrected, the ECC block 11 determines whether or not the number of errors is equal to or smaller than 2. Note that the error correction code is not limited to a humming code, but may be other error correction codes such as a Reed-Solomon code, etc.

Then, in a case where it is determined that the errors can be corrected, i.e., in a case where the errors are equal to or smaller than the predetermined number (step S260; Yes), the ECC block 11 performs error correction based on the error correction code (step S270). Then, the microprocessor 6 supplies the corrected data to the host system 4.

In a case where it is determined that the errors cannot be corrected, i.e., in a case where the errors are larger than the predetermined number (step S260; No), the microprocessor 6 replaces the read-out data with the data of the backup program (step S280). Specifically, for example, in a case where the page read out at step S250 is the tenth page of the block specified by the physical block address corresponding to the logical serial number LB0, the microprocessor 6 reads out the data of the backup program that is stored in the tenth page of the block specified by the physical block address corresponding to the logical serial number LB1000 into the buffer 9. Then, the microprocessor 6 supplies the data of the backup program newly read out to the host system 4 instead of the data read out at step S250.

After step S270 or S280, the microprocessor 6 determines whether or not it has read out the whole of the boot program from the plurality of blocks in which the boot program is stored (step S290).

In a case where not the whole of the boot program has been read out (step S290; No), the microprocessor 6 returns the process to step S250 to read out the data in the next page from the plurality of blocks in which the boot program is stored.

In a case where the whole of the boot program has been read out from the plurality of blocks in which the boot program is stored (step S290; Yes), the microprocessor 6 moves to the process of step S240.

Through the series of processes at steps S250 to S290 described above, the boot program including data from the backup program to replace only the error-uncorrectable data is written into the RAM in the host system 4.

Thereby, the host system 4 can execute the boot program. Thus, according to the present embodiment, it is possible to avoid a situation that the host system 4 cannot be activated due to its boot program not being able to be executed.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2005-172240 filed on Jun. 13, 2005 and including its specification, claims, drawings and summary. The disclosure of the above Japanese Patent Application is incorporated herein by reference in its entirety.

What is claimed is:

1. A memory controller, comprising:
  table holding unit which holds an address translation table for managing correspondence between logical blocks defined based on logical addresses designated by a host system which uses a flash memory as its storage medium, and physical blocks in the flash memory;
  an address managing unit which makes and modifies the address translation table based on logical numbers assigned to the physical blocks, wherein the logical numbers include numbers corresponding to logical blocks and numbers not corresponding to logical blocks;
  a writing unit which writes data in the physical blocks based on logical addresses designated by the host system, wherein data is stored in a physical block to which a logical number corresponding to the data is assigned;
  a reading unit which reads out data from the physical blocks based on the address translation table and transfers the data read out to the host system, wherein data is read out from a physical block corresponding to a logical block to which logical addresses designated by the host system belong; and
  a determination unit which determines whether or not a boot program to be executed by the host system is properly stored in the flash memory,
  wherein the boot program and its backup program are stored in arbitrary physical blocks, there are logical blocks corresponding to first logical numbers assigned to physical blocks storing the boot program, and there are not any logical blocks corresponding to second logical numbers assigned to physical blocks storing the backup program;
  the address managing unit also manages correspondence between logical blocks and logical numbers, and modifies the correspondence so that the second logical numbers replace the first logical numbers when the determination unit determines that the boot program is not stored properly; and the reading unit reads out the boot program or the backup program from physical blocks to which the first logical numbers or the second logical numbers are assigned.

2. The memory controller according to claim 1,
wherein: the writing unit writes a logical number in a physical block in which data are written so that the physical block stores the logical number corresponding to the data stored therein;
the address managing unit makes the address translation table by reading out the logical numbers from physical blocks in which data are stored; and
the determination unit determines that the boot program is not stored properly, in a case where the address translation table does not properly include information relating to physical blocks to which the first logical numbers are assigned.

3. The memory controller according to claim 2,
wherein: the writing unit writes the first logical numbers in physical blocks in which the boot program is written and writes the second logical numbers in physical blocks storage areas in which the backup program is written.

4. The memory controller according to claim 1,
wherein: the reading unit comprises an error correcting unit which corrects errors included in data read out; and
in a case where data read out which are a portion of the boot program includes more errors than are correctable by the error correcting unit, the address managing unit modifies correspondence between logical blocks and logical numbers means so that a logical number of second logical numbers assigned to a physical block storing a portion of the backup program corresponding to the portion of the boot program replaces a logical number of first logical numbers assigned to a physical block storing the portion of the boot program, and then the reading unit reads out the portion of the backup program instead of the portion of the boot program.

5. The memory controller according to claim 1,
wherein the writing unit also updates the backup program, when updating the boot program, the updated backup program being the same program as the updated boot program.

6. A flash memory system, comprising: the memory controller according to claim 1; and a flash memory.

7. The memory controller according to claim 1,
wherein the address managing unit modifies correspondence between logical blocks and logical numbers so that the second logical numbers replace the first logical numbers when the determination unit determines that the boot program is not stored properly, thereby rewriting the address translation table so that physical blocks storing the backup program are assigned to logical blocks corresponding to the first logical numbers instead of physical blocks storing the boot program; and
the reading unit reads out the boot program or the backup program from physical blocks to which the first logical numbers or the second logical numbers are assigned based on the address translation table when the host system is to be activated.

8. A control method of a flash memory storing a program to be executed by a host system when the host system is to be activated, wherein logical blocks are defined based on logical addresses designated by the host system, physical blocks are included in the flash memory, logical numbers are numbers assigned to the physical blocks, and the logical numbers include numbers corresponding to logical blocks and numbers not corresponding to logical blocks, comprising:
a storing step of storing a boot program and its backup program in arbitrary physical blocks, wherein physical blocks storing the boot program also store first logical numbers assigned thereto, physical blocks storing the backup program also store second logical numbers assigned thereto, the first logical numbers are numbers corresponding to logical blocks, and the second logical numbers are not corresponding to logical blocks;
a generating step of generating an address translation table based on logical numbers stored in physical blocks, which address translation table is for managing correspondence between logical blocks and physical blocks;
a determining step of determining whether or not the boot program is properly stored in the flash memory, wherein it is determined that the boot program is not properly stored in a case where address translation table does not properly include information relating to physical blocks to which the first logical numbers are assigned;
an updating step of modifying correspondence between logical blocks and physical blocks so that physical blocks to which the second logical numbers are assigned replace physical blocks to which the first logical numbers are assigned, in a case where it is determined at the determining step that the boot program is not stored properly; and
a reading step of reading out the boot program or the backup program from physical blocks to which the first logical numbers or the second logical numbers are assigned.

* * * * *